No. 681,608.  
G. P. BAUGHMAN.  
COMBINED SCOOP AND SIFTER.  
(Application filed Jan. 3, 1901.)  
Patented Aug. 27, 1901.
(No Model.)
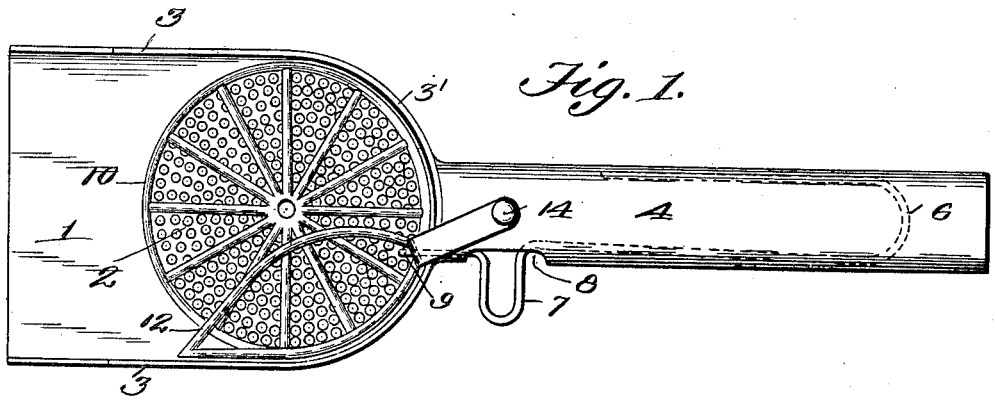
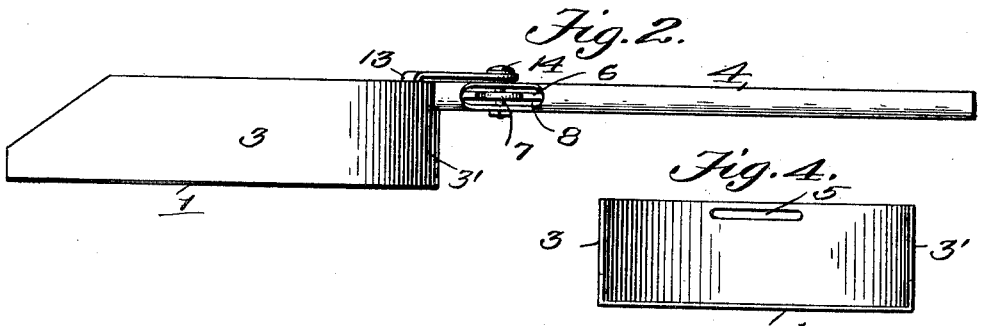
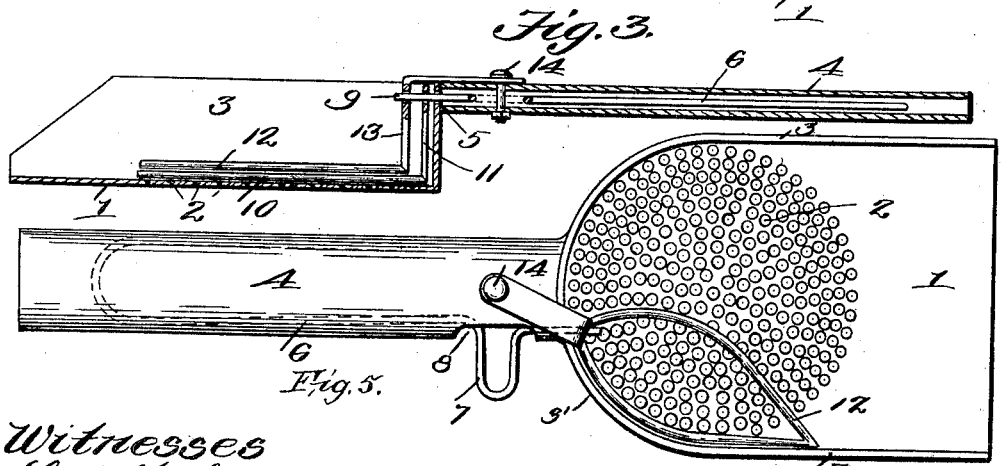
Witnesses  
Inventor  
George P. Baughman

UNITED STATES PATENT OFFICE.

GEORGE P. BAUGHMAN, OF WHATCHEER, IOWA.

COMBINED SCOOP AND SIFTER.

SPECIFICATION forming part of Letters Patent No. 681,608, dated August 27, 1901.

Application filed January 3, 1901. Serial No. 41,975. (No model.)

*To all whom it may concern:*

Be it known that I, GEORGE P. BAUGHMAN, a citizen of the United States, residing at Whatcheer, in the county of Keokuk and State of Iowa, have invented new and useful Improvements in a Combined Scoop and Sifter, of which the following is a specification.

This invention relates to certain new and useful improvements in combined scoops and sifters.

The invention aims to construct a combination scoop and sifter particularly adapted for scooping and sifting plaster, flour, granulated and powdered sugars, spices, and like material of a granulated and powdered form.

To this end the invention further aims to construct a combination scoop and sifter which shall be extremely simple, strong, durable, efficient in use, comparatively inexpensive to manufacture, and which consists of the novel combination and arrangement of parts hereinafter more specifically described, illustrated in the accompanying drawings, and particularly pointed out in the claims hereunto appended.

In describing the invention in detail reference is had to the accompanying drawings, forming a part of this specification, wherein like numerals of reference indicate corresponding parts throughout the several views, and in which—

Figure 1 is a top plan view of my combined scoop and sifter. Fig. 2 is a side elevation, Fig. 3 is a central longitudinal vertical section, and Fig. 4 is an end elevation, of the scoop. Fig. 5 is a top plan view of my improved sifter with the sifting-wheel removed.

Referring to the drawings by reference-numerals, the scoop consists of the bottom 1, provided with a series of countersunk perforations 2, the walls 3 3', suitably secured to the bottom, forming the sides and rear, respectively, and the hollow handle 4, connected to the rear wall 3', the latter provided with the slot 5, registering with the opening in the handle. Mounted in the hollow handle 4 is an actuating-spring 6, consisting of a piece of spring-wire bent substantially V-shaped, with one leg thereof engaging the inner face of one side of the handle, and the other or movable leg arranged at the opposite side of the handle and having a portion of its length bent substantially U-shaped at right angles thereto, as at 7. The U-shaped bend of the movable leg extends through the opening 8, formed in the side of the handle. The movable leg of the spring projects, as at 9, from the handle 4 and extends through the slot 5 in the rear wall 3'. Arranged upon the perforated portion of the bottom 1 of the scoop is the sifting-wheel, constructed of round wire 10, provided with an upwardly-extending arm 11, through which projects the end 9 of the movable leg of the actuating-spring. Mounted upon the sifting-wheel 10 is an elliptical-shaped hollow agitator 12, constructed of round wire and formed integral at its rear end with a hanger 13, having the top thereof bent at right angles thereto and pivotally connected to pin 14, suitably secured to the handle 4. The end 9 of the movable leg of the spring extends through the hanger 13 in the same manner as through the arm 11, the latter being interposed between the hanger 13 and the wall 3'.

The operation of the scoop is as follows: By pressing upon and removing the pressure from the U-shaped portion of the movable leg of the actuating-spring it will give a simultaneous oscillating movement to the sifting-wheel and agitator, materially assisting the sifting of the material contained in the scoop through the perforated bottom thereof; and it is thought the many advantages of such construction can be readily understood from the foregoing description taken in connection with the accompanying drawings, and it will also be noted that minor changes may be made in the details of construction without departing from the general spirit of my invention.

Having thus fully described my invention, what I claim as new is—

1. The combination with a scoop provided with a perforated bottom, of an agitator arranged above the said perforated bottom, a sifting-wheel interposed between said perforated bottom and agitator, and a spring-actuated means carried by the scoop and adapted to simultaneously oscillate said agitator and wheel.

2. A scoop having a perforated bottom, a sifting-wheel mounted upon the same, an agitator mounted upon said sifting-wheel, and means connected to the said agitator and wheel for simultaneously oscillating the same.

3. A scoop provided with a handle and a perforated bottom, a sifting-wheel mounted thereon, a vertically-extending arm connected to said wheel for supporting the same, and means mounted in the handle and extending through the same and said arm near the top thereof for oscillating said wheel.

4. A scoop having a perforated bottom and a hollow handle, a sifting-wheel mounted upon the perforated bottom, an arm formed integral with said wheel, an agitator mounted upon said wheel, a hanger formed integral with said agitator, and means mounted in said handle and connected to said arm and hanger for simultaneously oscillating the said wheel and agitator.

5. A scoop having a perforated bottom and a handle, a sifting-wheel mounted upon the said perforated bottom, an arm connected with said sifting-wheel, an agitator mounted upon said sifting-wheel, a hanger connected to the said agitator and pivotally attached to said handle, and means mounted in the handle and extending through the said arm and hanger for simultaneously oscillating said wheel and agitator.

6. In a scoop, a handle therefor, a perforated bottom, an agitator mounted above the same, a hanger connected to said agitator for suspending the same and pivotally attached to the handle of the scoop, and a spring mounted in the handle of the scoop, extending from one side thereof and projecting through one end thereof and the said hanger for oscillating said agitator.

7. In a scoop, a handle therefor, a perforated bottom, an agitator, a vertically and longitudinally extending hanger for suspending said agitator within said scoop, means for pivotally connecting one end of said hanger to said handle, and means mounted in said handle and extending through one end thereof and said hanger for oscillating said agitator.

8. A scoop having its bottom provided with a series of countersunk perforations, an oscillating sifting-wheel mounted on said bottom, an oscillating agitator suspended in said scoop, and means for oscillating said wheel and agitator simultaneously.

9. A scoop having its bottom provided with a series of countersunk perforations, a sifting-wheel, an arm formed integral therewith, an agitator, a hanger formed integral therewith and pivotally connected to said scoop, and means extending through said arm and hanger for simultaneously operating said wheel and agitator.

In testimony whereof I have hereunto set my hand in presence of two subscribing witnesses.

GEORGE P. BAUGHMAN.

Witnesses:
P. M. FLARITY,
C. W. NATION.